(12) United States Patent
Kirr et al.

(10) Patent No.: US 12,191,749 B2
(45) Date of Patent: Jan. 7, 2025

(54) GALVANOMETER DRIVE WITH ZERO-BACKLASH MOUNTING

(71) Applicant: SCANLAB GmbH, Puchheim (DE)

(72) Inventors: Norbert Kirr, Puchheim (DE); Tobias Edlboeck, Puchheim (DE); Thomas Lares, Puchheim (DE); Hans-Joachim Muenzer, Puchheim (DE)

(73) Assignee: SCANLAB GmbH, Puchheim (DE)

( * ) Notice: Subject to any disclaimer, the term of this patent is extended or adjusted under 35 U.S.C. 154(b) by 220 days.

(21) Appl. No.: 17/798,971

(22) PCT Filed: Feb. 1, 2021

(86) PCT No.: PCT/EP2021/052332
§ 371 (c)(1),
(2) Date: Aug. 11, 2022

(87) PCT Pub. No.: WO2021/165026
PCT Pub. Date: Aug. 26, 2021

(65) Prior Publication Data
US 2023/0340998 A1    Oct. 26, 2023

(30) Foreign Application Priority Data
Feb. 17, 2020 (DE) .......................... 102020201957.6

(51) Int. Cl.
*H02K 7/08* (2006.01)
*F16C 19/54* (2006.01)
(Continued)

(52) U.S. Cl.
CPC ............. *H02K 7/08* (2013.01); *H02K 7/083* (2013.01); *H02K 7/088* (2013.01); *F16C 19/54* (2013.01);
(Continued)

(58) Field of Classification Search
CPC ...... F16C 25/083; F16C 35/077; F16C 19/54; F16C 23/08; F16C 2380/26;
(Continued)

(56) References Cited

U.S. PATENT DOCUMENTS

| 4,135,119 A | 1/1979 | Brosens |
| 5,598,048 A | 1/1997 | Dunfield et al. |

(Continued)

FOREIGN PATENT DOCUMENTS

| CN | 103 999 334 A | 8/2014 |
| DE | 1289686 | 2/1969 |

(Continued)

OTHER PUBLICATIONS

International Search Report for PCT Application No. PCT/EP2021/052332, dated May 4, 2021, 5 pages.

*Primary Examiner* — Alexander A Singh
(74) *Attorney, Agent, or Firm* — Seyfarth Shaw LLP

(57) ABSTRACT

A galvanometer drive with a rotor that is rotatable about an axis of rotation and includes a magnet, and a stator unit that surrounds the rotor and includes a coil, the rotor being supported by two bearings, at least one of which is a floating bearing, such that the rotor can perform a rotational movement relative to the stator unit about the axis of rotation. A radial movement limiting device is adapted to limit the radial movement of the floating bearing with respect to the stator unit.

18 Claims, 8 Drawing Sheets

(51) Int. Cl.
  *F16C 25/08* (2006.01)
  *F16C 35/077* (2006.01)
(52) U.S. Cl.
  CPC .......... *F16C 25/083* (2013.01); *F16C 35/077* (2013.01); *F16C 2229/00* (2013.01); *F16C 2380/26* (2013.01)
(58) Field of Classification Search
  CPC ...... F16C 2229/00; H02K 7/08; H02K 7/081; H02K 7/083; H02K 7/085; H02K 7/086; H02K 7/088; H02K 7/09
  USPC .................................................. 310/90, 90.5
  See application file for complete search history.

(56) References Cited

U.S. PATENT DOCUMENTS

| | | | |
|---|---|---|---|
| 5,811,903 | A | 9/1998 | Ueno et al. |
| 6,921,893 | B1 | 7/2005 | Petschik et al. |
| 10,233,968 | B2 | 3/2019 | An et al. |
| 2003/0007705 | A1* | 1/2003 | Bosen ................... F16C 35/077 384/99 |
| 2008/0036309 | A1 | 2/2008 | Toyama et al. |
| 2015/0075899 | A1 | 3/2015 | Kikuchi et al. |
| 2017/0012491 | A1 | 1/2017 | Schoeb et al. |
| 2017/0096162 | A1 | 4/2017 | Fuechsel et al. |
| 2018/0080499 | A1* | 3/2018 | An ........................ F16C 27/066 |

FOREIGN PATENT DOCUMENTS

| | | |
|---|---|---|
| DE | 19804328 | 8/1999 |
| DE | 19818634 | 11/1999 |
| DE | 29913367 | 12/1999 |
| DE | 60009171 | 10/2004 |
| DE | 102007037183 | 2/2008 |
| DE | 102012215443 | 3/2014 |
| EP | 3115616 | 1/2017 |
| GB | 908486 | 10/1962 |
| WO | 2014061156 | 4/2014 |
| WO | 2019228644 | 12/2019 |

* cited by examiner

GALVANOMETER DRIVE WITH ZERO-BACKLASH MOUNTING

TECHNICAL FIELD OF THE INVENTION

The invention is directed to a galvanometer drive, in particular to a galvanometer drive as used in laser applications for precise directing of the laser radiation to the processing location. Here, the galvanometers used typically comprise mirrors that are pivoted within a limited angular range that is smaller than +1/−90°, typically smaller than +/−30°, in order to direct the laser radiation to the processing location.

BACKGROUND OF THE INVENTION

First, to illustrate the problem underlying the invention, prior art known to the applicant will be described in more detail with reference to FIG. 1.

FIG. 1 shows a galvanometer drive known to the applicant. A rotor 110 comprising a permanent magnet is arranged within a stator unit 130 comprising a coil 125. Here, the rotor is supported by means of two bearings 140 and 150 in such a way that it can rotate about an axis of rotation R, which in FIG. 1 runs horizontally centrally through the rotor, relative to the stator unit 130. In the present application, the direction of the axis of rotation R is referred to as the axial direction, and directions perpendicular to this axis are referred to as radial directions.

By supplying control currents via electrical connection elements 300, a change in the magnetic field in the coil 125 of the stator unit 130 is caused, whereupon the rotor 110 containing the magnet executes a rotational movement relative to the flux guide part 120 of the coil 125, i.e., relative to the stator unit 130. In order to prevent the length expansion of the rotor as a result of thermal influences from leading to mechanical stresses which could result in damage of the rotor or the bearings 140 and 150 or impair the precision of the device, the bearing 150, in contrast to the fixed bearing 140, is designed as a floating bearing. This is implemented such that the outer ring 150a of the bearing 150 forms a clearance fit together with the bearing seat in the stator unit 130. A wave spring 200 is mounted under preload so that in the case of thermal movements (changes in size) of the rotor 110, the bearing 150 can follow the thermal movement to a certain extent. In this case, the wave spring 200 fixes the axial position of the bearing 150, so that the latter actually changes this axial position only in the case of thermally induced movements.

The use of a floating bearing 150 has the effect of avoiding a limitation of the rotational mobility or an overload of the rotor and bearings due to thermal stresses. In particular, the inner ring 150b of the bearing is fixedly attached to the rotor 110, while the outer ring 150a has some mobility in the axial direction (clearance fit) by providing a gap. In this case, the wave spring 200 causes a preload that impedes the movement of the outer ring of the bearing in the axial direction and leads to a bracing between the outer ring and the inner ring so that they cannot move radially with respect to one another. Nevertheless, the inventors were able to determine that the precision achievable with this galvanometer drive is not sufficient, for example, in environments where the galvanometer drive is exposed to shocks and vibrations.

SUMMARY OF THE INVENTION

It is therefore an object of the present invention to provide a galvanometer drive which is also suitable for high-precision directing of radiation to a processing location.

A galvanometer drive according to the invention with a rotor, which is rotatable about an axis of rotation and which comprises a magnet, and a stator unit which surrounds the rotor and comprises a coil, the rotor being supported by two bearings, at least one of which is a floating bearing, so that the rotor can perform a rotational movement about the axis of rotation relative to the stator unit, is characterized by a radial movement limiting device that is adapted to limit the radial movement of the floating bearing with respect to the stator unit.

Here, a radial direction in the galvanometer drive is a direction substantially, preferably exactly, perpendicular to the axis of rotation. Thus, the axis of rotation extends substantially, preferably exactly, in the axial direction.

The inventors found that when the precision requirements of a galvanometer drive are high, the radial movement of the rotor must be made more difficult: In the presence of an axially preloaded floating bearing, indeed interfering radial movement is not present in the bearing itself, but the diameter of the outer ring of the bearing must have a certain undersize in order to remain axially movable in the bearing seat. Thus, the outer ring has radial play in the bearing seat, i.e., relative to the element on which the outer ring of the floating bearing is mounted. The problem is that while radial mobility could theoretically be eliminated by providing a fixed connection between the floating bearing and the element to which the floating bearing is mounted, such a fixed connection would make the floating bearing a fixed bearing with the known disadvantages (e.g., tensioning up during thermal expansion). Therefore, according to the invention, the galvanometer drive is provided with its own radial movement limiting device, the purpose of which is not to eliminate radial play in the floating bearing itself, but to limit the radial movement of the floating bearing relative to the element on which the outer ring of the floating bearing is supported. In this context, limitation of the radial movement device both making the radial movement more difficult, i.e. reducing the mobility, and preventing the radial movement.

The bearing is mounted between the rotor and the stator unit. In this context, elements that are rigidly connected to the stator unit are also considered to be components of the stator unit. For example, such an element rigidly connected to the stator unit may be a flux guide part, which means a component arranged outside the coil and serving to guide the magnetic flux of the magnetic field generated by the coil, in particular also to establish a closed magnetic circuit. Furthermore, an outer housing of the stator unit can also be considered as an element rigidly connected to the stator unit, even if it can exert no or very little effect on the magnetic flux generated by the coil. In short, when it is mentioned that an object is attached to the stator unit or is arranged relative to the stator unit, this object may in particular be attached to an element rigidly connected to the stator unit, such as a flux guide part in the stator unit or an outer housing of the stator unit.

In particular, the stator can have the shape of a straight cylinder, especially a circular cylinder, or a prism whose axis of symmetry extends in the direction of the axis of rotation. Here, the mathematical cylinder concept applies. Here, cases in which there is a slight conicity of the cylinder or prism are also to be included.

Preferably, the floating bearing comprises an outer ring, an inner ring and a plurality of rolling elements between the inner ring and the outer ring, and the inner ring is rigidly attached to the rotor and the outer ring is displaceable in the direction of the axis of rotation, wherein the radial movement limiting device limits the radial movement of the outer ring with respect to the stator unit.

The floating bearing can be a rolling element bearing, which is attached with its inner ring to the rotor and with its outer ring to the stator unit. All tapes of construction known in the prior art come into question for the rolling element bearing. In this application, a rigid attachment is understood to mean a fixed connection that does not allow any space for movement.

Further preferably, a ratio of radial stiffness to axial stiffness at the floating bearing is greater than 10, preferably greater than 50, more preferably greater than 100.

Although preferably radial movement should be completely prevented by the radial movement limiting device, this can lead to problems, as already mentioned, if as a consequence axial movement of the floating bearing is also too strongly limited. Preferably, however, the radial movement limiting device will at least be designed in such a way that the mentioned ratios of radial stiffness to axial stiffness are achieved, i.e. a defined mobility in the axial direction as a result of relatively low forces and (as low as possible) mobility in the radial direction even at high forces. A possible upper limit can be found here in the range of 1000. The term "stiffness" can refer, for example, to a displacement stiffness or spring stiffness provided by the radial movement limiting device. In general, radial or axial (displacement) stiffness refers to the resistance to a shift or displacement in the radial or axial direction, respectively.

Further preferably, the radial movement limiting device is a spring element attached to the floating bearing, by which the floating bearing is axially subjected to pressure, wherein the spring element has a portion rigidly attached to the floating bearing and another portion rigidly attached to the stator unit.

Preferably, the spring element extends in radial direction and, in doing so, has rotational symmetry. Since the spring element applies axial pressure to the floating bearing, it fulfills two tasks simultaneously: on the one hand, the axially exerted pressure causes the floating bearing to actually move in the axial direction only during thermal movements, and on the other hand, the radial mobility is limited in that, by the spring element, the radial movement of the floating bearing with respect to the stator unit is impeded to a greater extent than the axial movement.

Further preferably, the spring element has a rotationally symmetrical, star-shaped arrangement of n leaf spring elements, where n is a natural number greater than or equal to 3.

An exemplary value for n may be n=3, 4, 5, 6, 7, 8, 9, 10, 11, 12, 20, 50, or 100. Values above n=100 are unlikely to be realized in practice, so n=100 may be considered an upper limit.

Further preferably, the number n of leaf spring elements is less than or equal to 100, preferably less than or equal to 20, even more preferably less than or equal to 8.

Further preferably, the spring element is designed as a disc spring or diaphragm spring.

A disc spring or diaphragm spring can be regarded as a special case of a rotationally symmetrical, star-shaped arrangement of leaf spring elements, namely as an embodiment in which the leaf spring elements merge into one another. Mixed forms are also conceivable here, i.e. in which only some of the leaf spring elements merge into one another, although the presence rotational symmetry is still preferred. In a special embodiment, the disc spring or diaphragm spring is provided with recesses, preferably arranged rotationally symmetrically.

Further preferably, the spring element has a displacement stiffness or spring stiffness in the radial direction which is greater than the displacement stiffness or spring stiffness, respectively, in the axial direction by at least a factor of 50, more preferably at least a factor of 100, even more preferably at least a factor of 300.

A high ratio of the displacement stiffness or spring stiffness in the radial direction to the displacement stiffness or spring stiffness in the axial direction can be achieved in particular with a rotationally symmetrical, star-shaped arrangement of leaf spring elements. In practice, an upper limit for the ratio of the spring constants is probably a value around 1000.

Further preferably, the displacement stiffness or spring stiffness in radial direction has a value above 4 kN/mm, preferably above 20 kN/mm, and below 1000 kN/mm.

The spring stiffness can be adjusted, among other things, by selecting the material thickness (sheet thickness) for the formation of the spring element, by the number and position of reinforcements in the material, by a preload in the mounted state or by the shape and/or number of leaf spring elements that are, for example, arranged star-shaped.

Further preferably, the radial movement limiting device is a rolling guide mounted between the floating bearing and the stator unit, which is rigidly connected to both the floating bearing and the stator unit.

The rolling guide can be designed, for example, as a ball cage guide or ball guide, which can then absorb axial movement of the floating bearing and at the same time prevent radial movement of the floating bearing.

Further preferably, the rolling guide consists of a guide inner element, a guide outer element and a plurality of rolling elements arranged therebetween.

The guide inner element can be a hollow guide shaft which radially surrounds the floating bearing and is rigidly connected thereto, in particular to the outer ring thereof. The guide outer element can be a guide sleeve which radially surrounds the guide inner element with the rolling elements arranged between them and is rigidly connected to the stator unit. In particular, the rolling elements (balls) can be of single-row or multi-row design, with the rolling elements being kept spaced at equal distance by a cage. As far as the materials suitable for the rolling guide are concerned, the materials known in the prior art can be used, i.e. in particular steel or ceramic for the rolling elements and brass, plastic or also steel for the cage.

Further preferably, the guide inner element is formed in one piece with the floating bearing and/or the guide outer element is formed in one piece with the stator unit.

The one-piece design ensures on the one hand that movements between the guide inner element and the floating bearing or between the guide outer element and the stator unit are effectively prevented. On the other hand, the reduction in components simplifies the structure.

Further preferably, the rolling guide is preloaded.

The preload prevents radial play within the rolling guide, i.e. a movement of the guide inner element relative to the guide outer element in the radial direction, with the rolling elements rolling frictionally between the guide shaft and guide sleeve as a result of the preload.

Further preferably, the radial movement limiting device applies a force to the floating bearing in the radial direction.

By applying a force to the floating bearing in the radial direction, the radial movement of the floating bearing in this direction is limited. Even if a force exerted on the floating bearing also has a force component acting in the axial direction, the force component acting in the radial direction nevertheless makes movement in the radial direction more difficult.

Further preferably, the radial movement limiting device has a spring element that is mounted between the stator unit and the rotor such that the spring element exerts a force on the rotor in the radial direction.

Various forms of design are possible for the spring element, e.g. it can be designed as a helical spring or as a rubber spring, the term "rubber" being representative of any suitable elastic material. In particular, the spring element can also be a resilient pressure element with which the position and the spring force can be adjusted.

Further preferably, the radial movement limiting device has a weight that generates the force on the floating bearing in the radial direction as a result of the action of gravity.

The weight force can be generated, for example, by designing the outer ring of the floating bearing from a material having a high specific weight. Alternatively or additionally, a corresponding weight can be arranged outside the floating bearing and connected to it.

Further preferably, the radial movement limiting device applies a force in the radial direction to the floating bearing via electromagnetic interaction.

For example, a corresponding force could be generated by means of a switchable electromagnet or a permanent magnet.

Further preferably, a force on the rotor in radial direction is generated by generating a radially asymmetric magnetic field between the rotor and the stator unit.

Such a radially asymmetric magnetic field results in a radially asymmetric magnetic flux and thus in a force acting in the radial direction between the floating bearing and the stator unit.

Further preferably, a radially asymmetric magnetic field is generated by an asymmetry of the rotor and/or of the stator unit, in particular the presence of at least one region in the rotor or in the stator unit that has a different magnetic susceptibility than the rest of the rotor or the stator unit, respectively.

The asymmetry of the field lines can be generated by a radial asymmetry of the stator unit, e.g. of a flux guide part or an outer housing, or of the rotor. In particular, a region with a different magnetic susceptibility can be a cavity (for example, a gas-filled cavity).

BRIEF DESCRIPTION OF THE DRAWINGS

Further features and expediencies of the invention will be apparent from the description of exemplary embodiments with reference to the accompanying figures.

DETAILED DESCRIPTION OF THE EMBODIMENTS

First Embodiment

Figure 1:
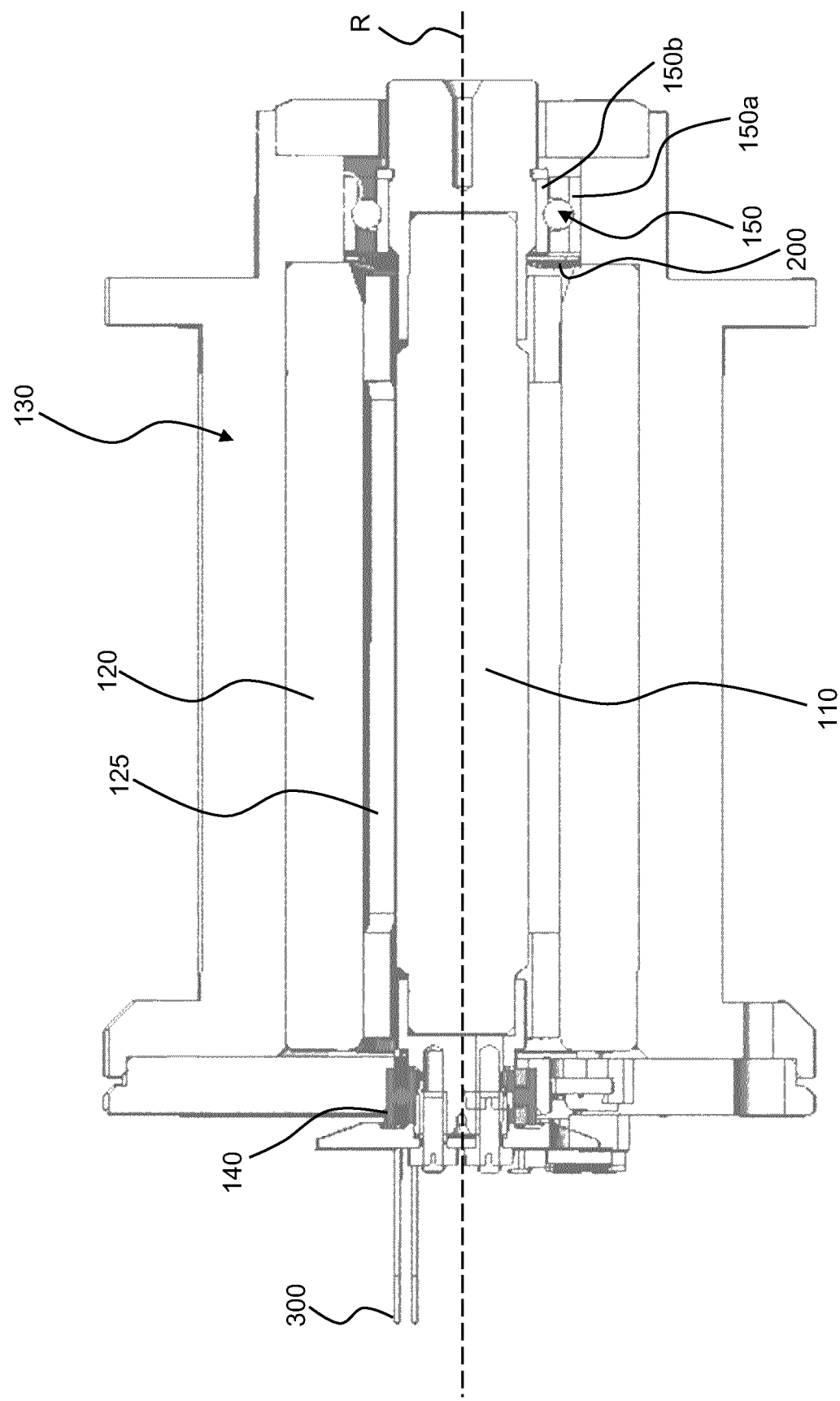
FIG. 1 shows a galvanometer drive known to the applicant.
Figure 2:
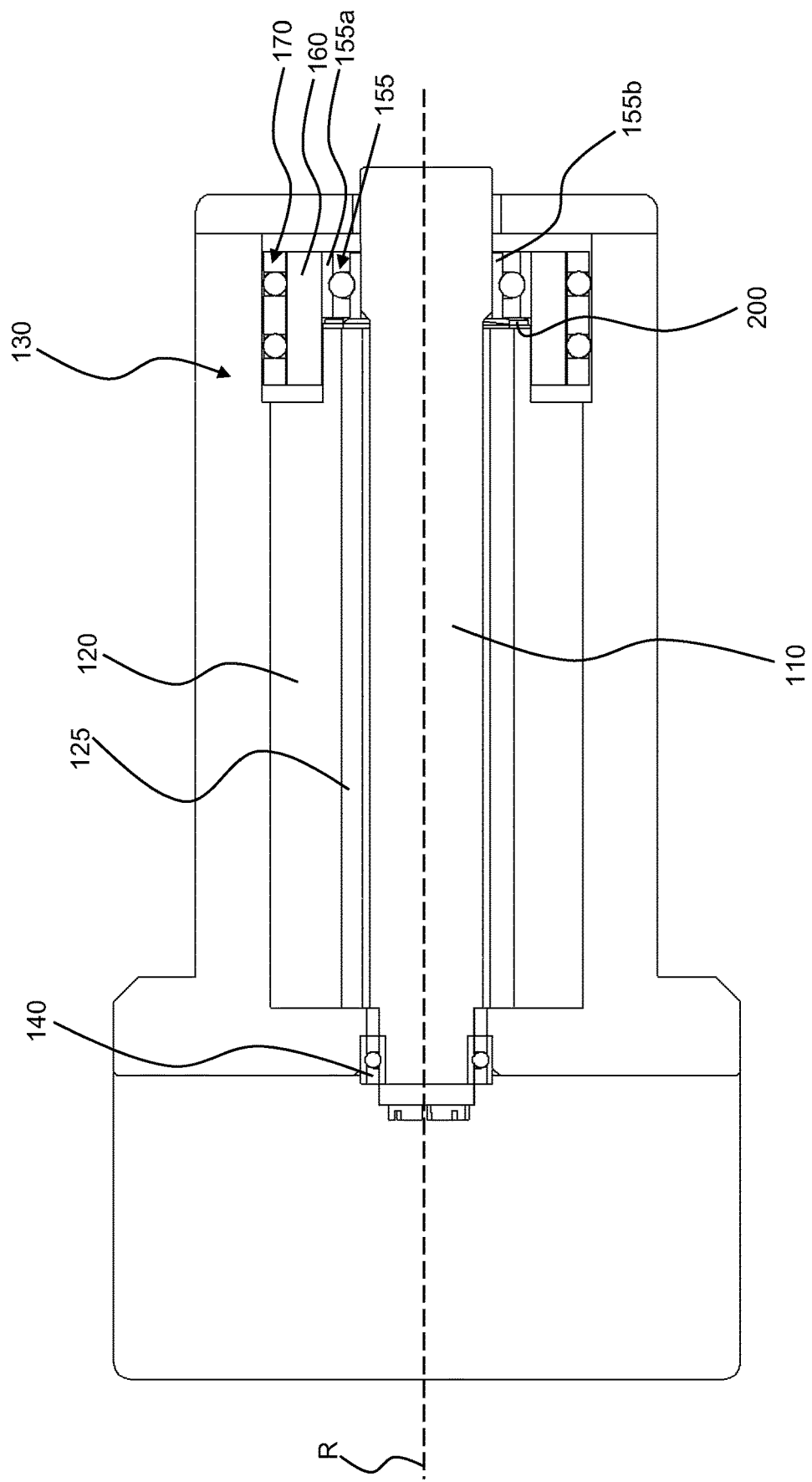
FIG. 2 shows a galvanometer drive according to a first embodiment of the invention.

FIG. 2 shows a galvanometer drive according to a first embodiment of the invention. The galvanometer drive shown in FIG. 2 is very similar to that of FIG. 1. The same elements are therefore generally provided with the same reference signs. According to the first embodiment, in order to limit the radial movement of the floating bearing with respect to the stator unit 130, which can lead to undesired radial movements of the rotor 110, a rolling guide 170 is arranged between the floating bearing (reference sign 155 in FIG. 2) and the housing 130 to effect a limitation of the radial movement. Specifically, the rolling guide 170 is inserted between a guide shaft 160 and the stator unit 130. The guide shaft 160 is a hollow cylindrical element that is rigidly connected to the outer ring 155*a* of the floating bearing 155. Furthermore, the guide shaft 160 is rigidly connected to the rolling guide 170. In FIG. 2, in this regard, the guide shaft 160 acts as the "inner ring" of the rolling guide 170. The outer ring of the rolling guide 170 (the guide sleeve) is rigidly connected to the stator unit 130, with FIG. 2 showing the example in which the outer ring is integrally formed with the stator unit 130.

In the arrangement described, the outer ring 155*a* of the floating bearing 155 can move against the spring force of the wave spring 200. Due to the rigid connection of the floating bearing 155 to the guide shaft 160 and the presence of the rolling guide 170, movement of the floating bearing 155 in the axial direction causes the guide shaft 160 and the floating bearing 155 to be able to move in the axial direction relative to the stator unit 130. On the one hand, movement of the floating bearing in the radial direction is prevented by the rigid connections between the floating bearing 155 and the guide shaft 160, on the one hand, and between the guide shaft 160 and the stator unit 130, on the other hand. On the other hand, radial mobility within the rolling guide can be prevented by a preload, for example by the rolling elements (balls) having an oversize with respect to the distance between the guide shaft and guide sleeve.

A rigid connection of the floating bearing 155 to the guide shaft 160 or of the guide sleeve to the stator unit cannot be achieved only by a one-piece or integrally formed design of floating bearing outer ring 155*a* and guide shaft 160 or guide sleeve and stator unit. Other possibilities for a zero-backlash connection would be an interference fit, gluing or other types of connection that eliminate mobility in the axial and radial directions.

Second Embodiment

Figure 3:
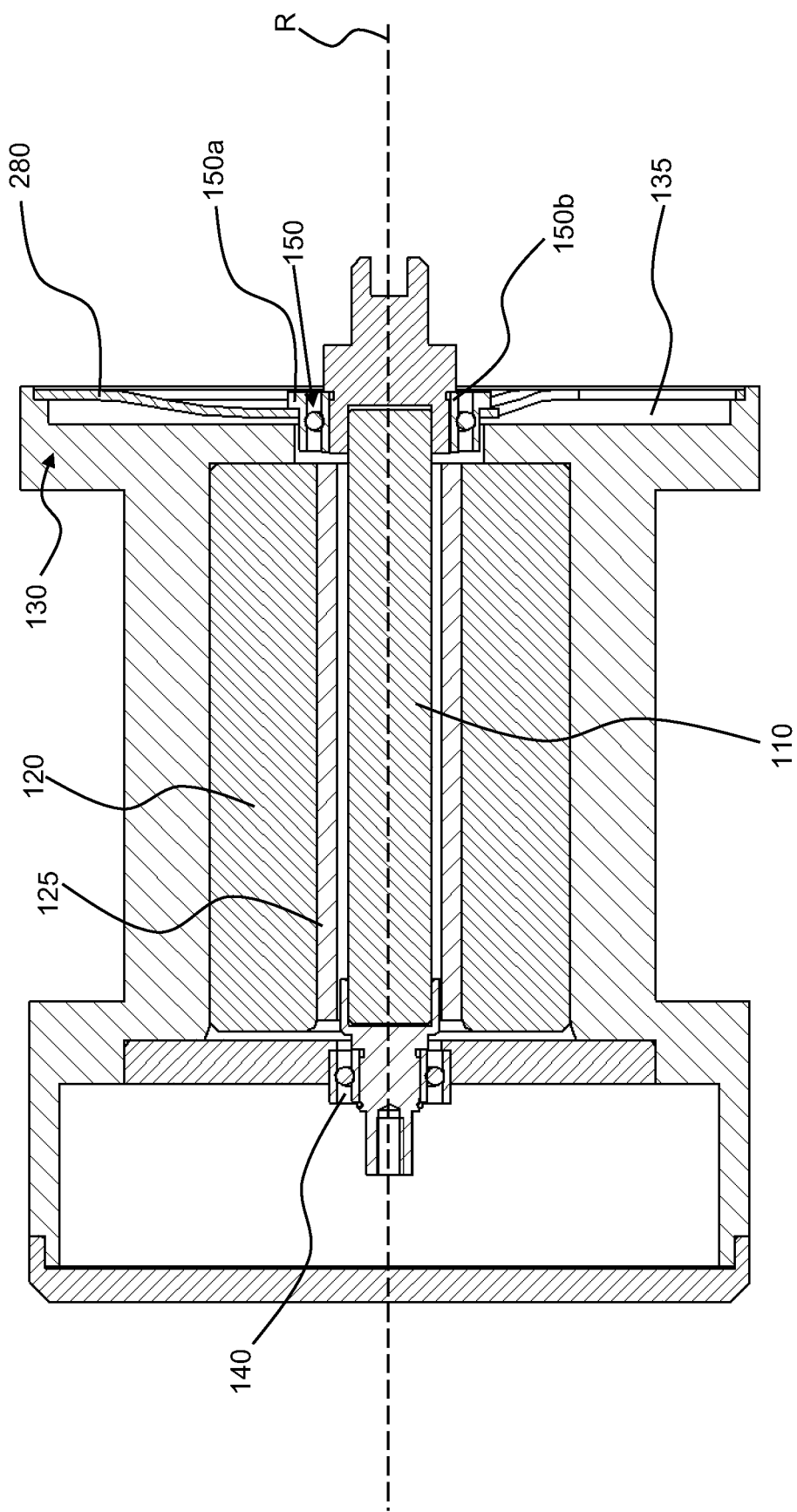
FIG. 3 shows a second embodiment of the galvanometer drive according to the invention.

FIG. 3 shows a second embodiment of the galvanometer drive according to the invention. Again, identical or analogous elements to those in FIG. 1 are generally provided with the same reference signs. In particular, the floating bearing 150 with its outer ring 150*a* can be designed in the same way as the floating bearing 155, except for the rigid or integral connection of the outer ring 155*a* to the guide shaft 160. In contrast to the embodiment of FIG. 1, in the second embodiment in FIG. 3 there is no wave spring 200 on the front side of the floating bearing 150. Instead, the stator unit is provided on the front side with a recess 135 for receiving a spring element 280. The spring element 280 surrounds the floating bearing 150 in the radial direction and engages radially on the outer ring 150a of the floating bearing 150. The spring element in this case extends substantially in a radial direction, i.e. perpendicular to the axis of rotation R. With the outer side (in radial direction), the spring element 280 engages the stator unit 130. For clamping the spring element 280, both the outer ring 150a of the floating bearing 150 and the stator unit 130 can be provided with a groove into which the spring element 280 is inserted. The spring element 280 is characterized by the fact that, in the mounted state, its dimension in the radial direction is preferably at least eight times greater than its dimension in the axial direction. Here, the dimension in the radial direction refers to the extension between the floating bearing 150 and the stator unit 130, i.e. a radius (if the spring element 280 is circular) rather than a diameter. It should be noted that the spring element does not necessarily have to be mounted in a recess 135 of the stator unit 130, but optionally the recess can also be omitted, provided that sufficient space is available to attach the spring element externally on the outer ring of the floating bearing.

Due to the special shape and dimensions of the spring element 280, it is able to exhibit significantly greater stiffness in the radial direction than in the axial direction. Thus, instead of the wave spring, it can restrict the mobility of the floating bearing in the axial direction, but not completely prevent it, so that, for example, thermal expansion of the rotor can take place. In contrast, movement in the radial direction is suppressed as a result of the greater stiffness in the radial direction. The ratio of the spring constants or spring stiffnesses in the radial direction and axial direction to one another can be adjusted by the shape of the spring element and, above all, via its outer diameter. The larger the outer diameter, the larger the ratio of the spring constants or spring stiffnesses in the radial and axial directions to each other for a given inner diameter. A value to be set for the spring stiffness or spring constant in the radial direction also depends on the dimension of the spring element in the radial direction and also on the masses to be moved. It has been shown that for the usual areas of application of the galvanometer drive, a value above 4 kN/mm is sufficient for the spring stiffness or spring constant in the radial direction; preferably, a value above 20 kN/mm is selected. Of course, in reality there will also be an upper limit for the possible spring constant or spring stiffness in the radial direction, but this should probably only be reached at about 1000 kN/mm.

The spring element can, for example, be formed from a steel sheet with a sheet thickness of, for example, 0.5 mm. In particular, it can be a disc spring. Among other things, the latter can be designed in such a way that, if radial symmetry is present in the mounted state, the axial position of an annular region of the disc spring changes periodically (e.g. sinusoidally) with the position of the region in the radial direction.

Figure 4:
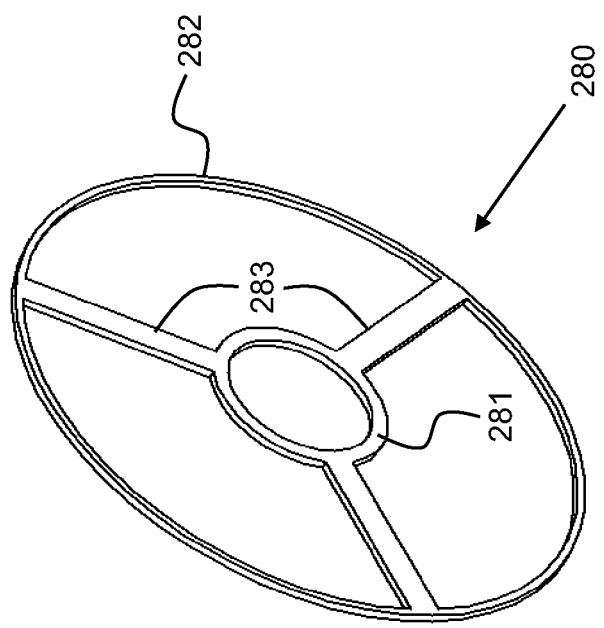
FIG. 4 shows a specific design of the spring element of the second embodiment.

Larger ratios between radial spring constant and axial spring constant can be achieved if a kind of spring star is used instead of a full-surface disc spring, as shown in FIG. 4. A spring element 280 can be seen in FIG. 4, which is formed by an inner ring 281 abutting the floating bearing 150 and an outer ring 282 abutting the stator unit 130. The inner ring 281 and the outer ring 282 are connected to each other via a rotationally symmetrical, star-shaped arrangement of three leaf spring elements 283. The leaf spring elements 283 have an elongate shape similar to the spokes of a steering wheel. Preferably, a ratio of the dimension in radial direction to the dimension in tangential direction is at least 3:1, particularly preferably at least 10:1. The exact shape of the leaf spring elements also depends on the number of leaf spring elements provided. Thus, there need not necessarily be three leaf spring elements, this is only the minimum number. In principle, any other number n of leaf spring elements is possible (e.g. n=4, 5, 6, 7, 8, 9, 10, 11, 12, etc.). Of course, at some point it becomes uneconomical to further increase the number of leaf spring elements, resulting in an upper limit for the number of leaf spring elements. The spring element shown in FIG. 4 can, for example, be formed from steel sheet with a sheet thickness of 0.5 mm.

Figure 5:
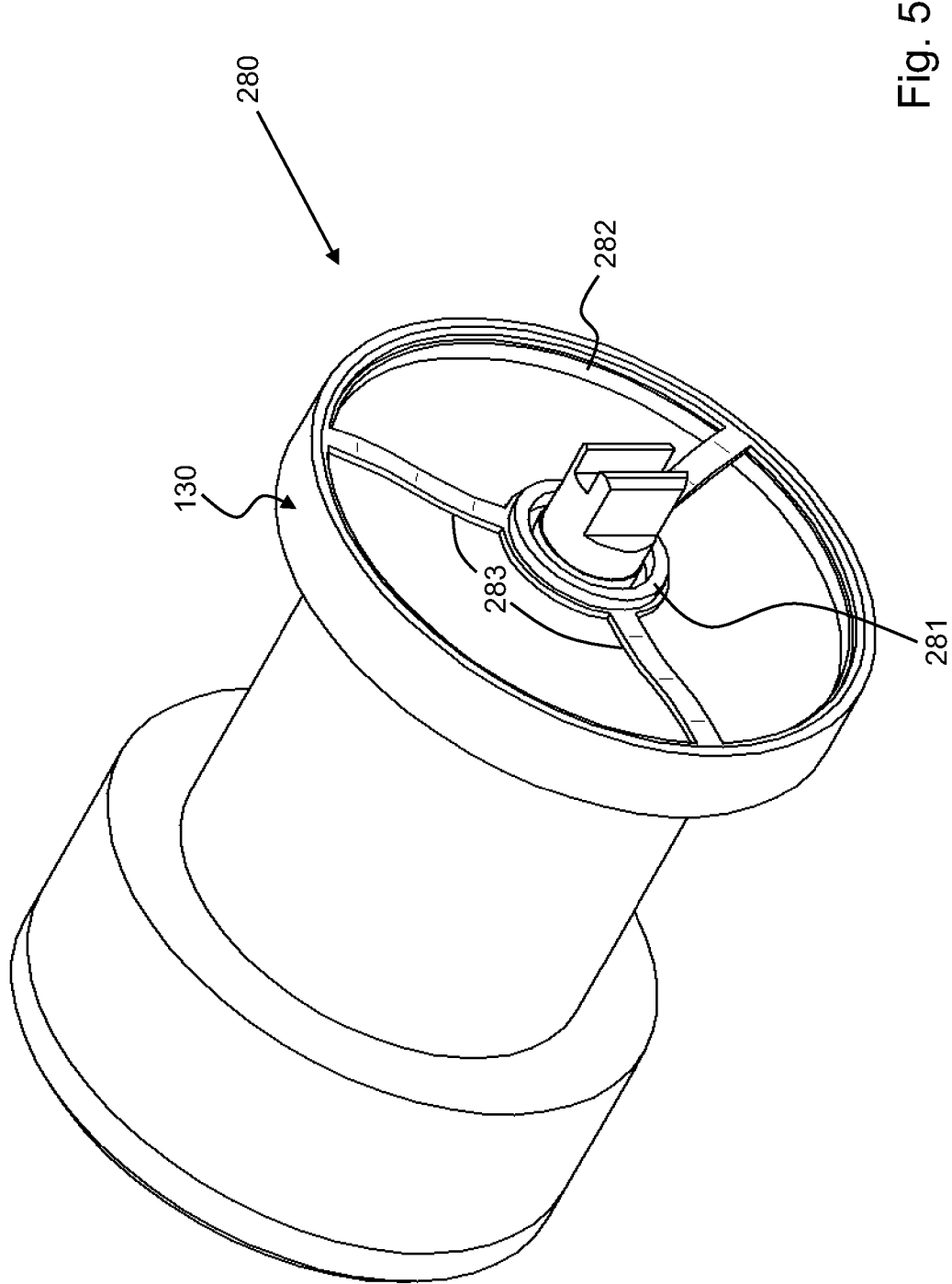
FIG. 5 shows a mounting situation for the spring element of the second embodiment.

FIG. 5 shows a mounting situation for the spring element 280 using the example of the spring star shown in FIG. 4. A spring force in the axial direction is generated by mounting the spring element 280 with preload. Accordingly, FIG. 5 shows a curvature of the leaf spring elements 283, while FIG. 4 shows straight leaf spring elements 283, corresponding to the relaxed state of the spring element 280 in FIG. 4. To bring about the preload, for example, the outer ring 282 can be mounted in such a way that in the relaxed state of the spring element the outer ring is displaced in the axial direction relative to the inner ring and in this state the spring element is fixed to the stator unit 130 and to the floating bearing 150. For example, the axial displacement of the outer ring 282 relative to the inner ring 281 can be adjusted by inserting distance elements of different thickness (depending on which preload is to be set) between the stator unit and the outer ring 282 (in the axial direction).

To prevent undesirable radial play between the floating bearing and the spring element 280 or between the spring element 280 and the stator unit 130, the spring element should be fixedly connected to the stator unit 130 or the floating bearing 150 (e.g. by welding, gluing, screwing, pressing, etc.). It should also be noted that the described mounting with preload of the spring element 280 is implemented in the same way for other shapes of the spring element than those shown in FIGS. 4 and 5, e.g. if the spring element 280 is a disc spring.

Third Embodiment

Figure 6:
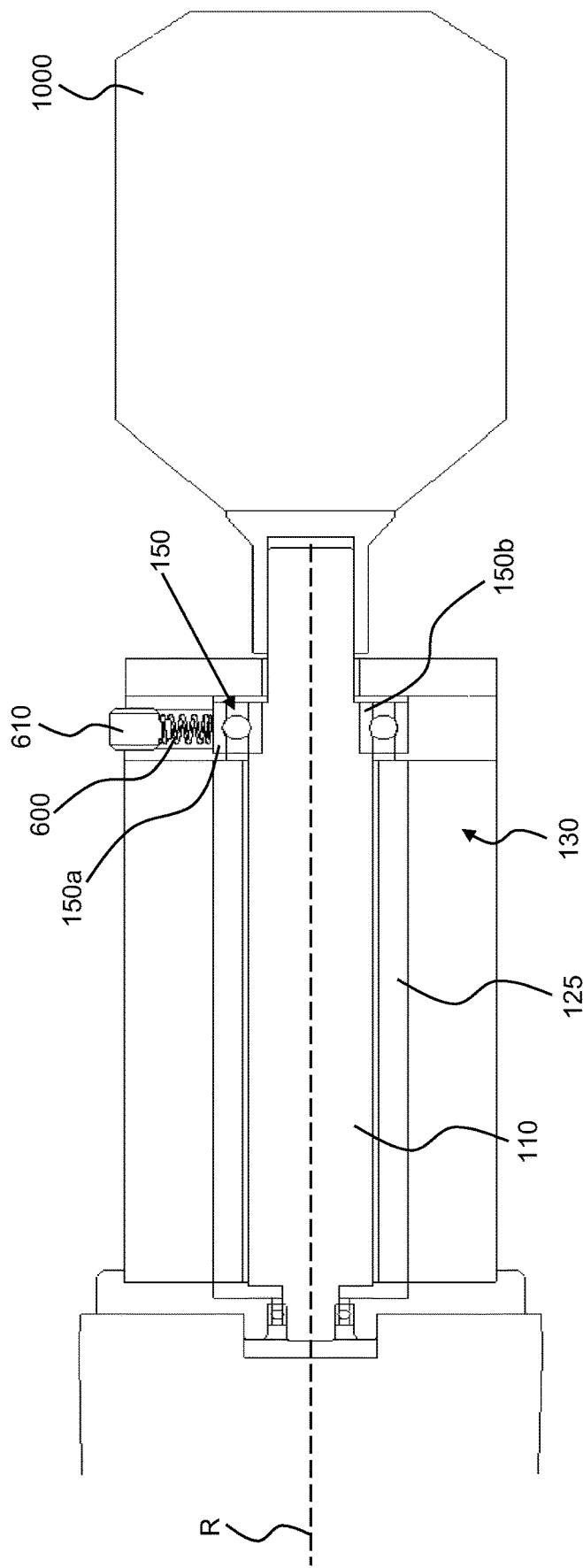
FIG. 6 shows a modification of a galvanometer drive according to a third embodiment of the invention.
Figure 7:
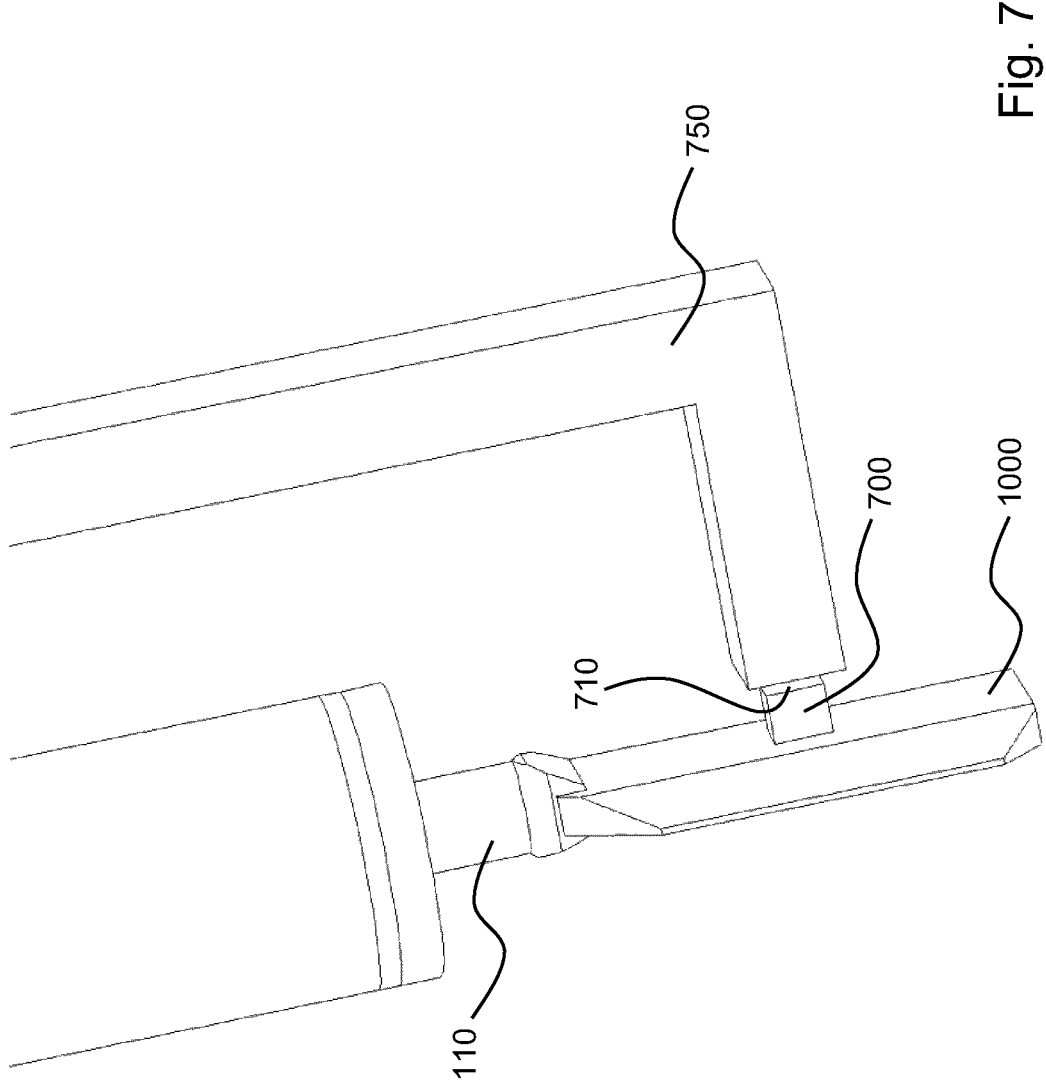
FIG. 7 shows a further modification of a galvanometer drive according to a third embodiment of the invention.
Figure 8:
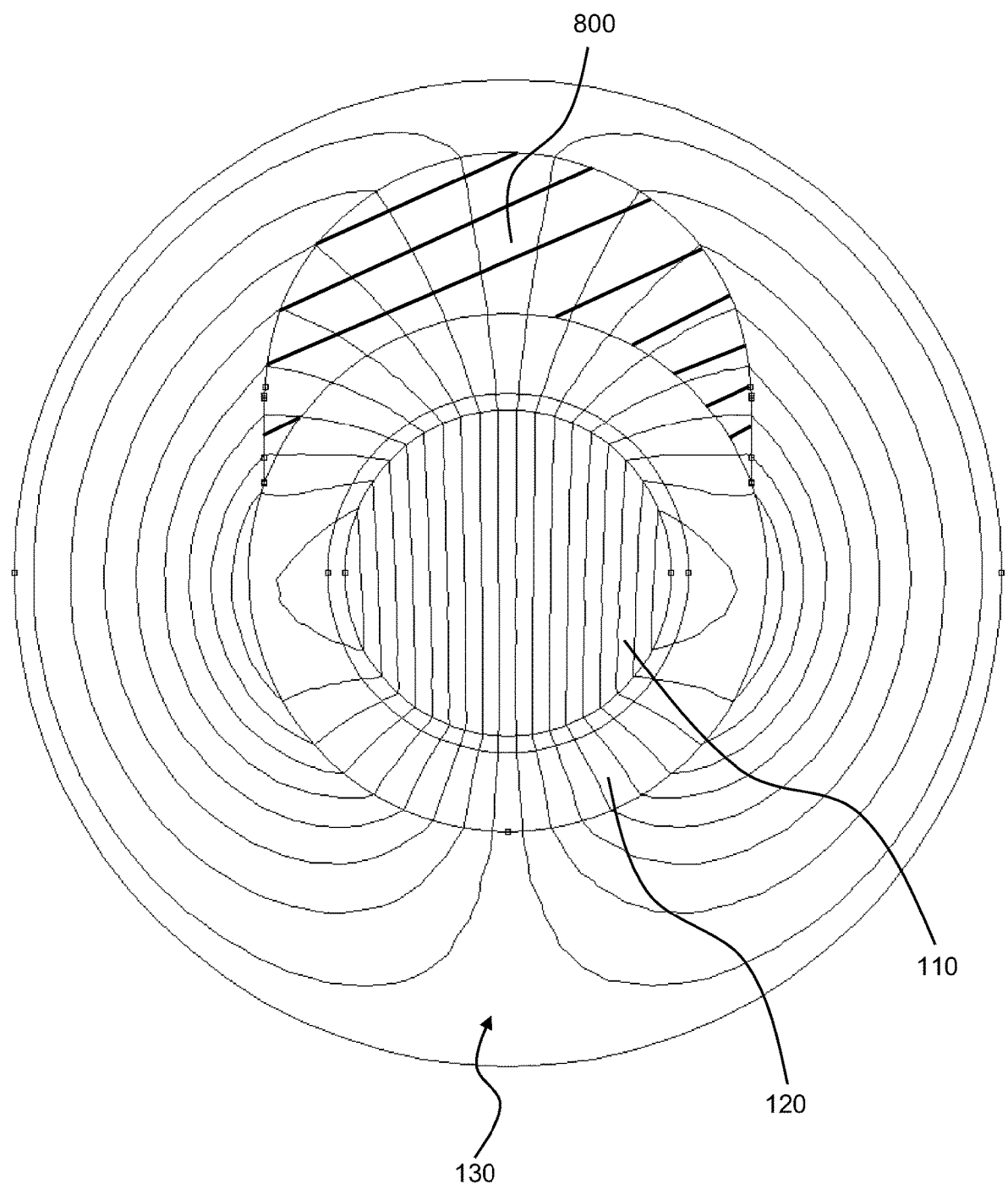
FIG. 8 shows another modification of a galvanometer drive according to a third embodiment of the invention.

FIGS. 6 to 8 show variants of a third embodiment of the invention in which, with the exception of the particular features described in each case, the same configuration as in FIG. 1 is present. The basic idea of the third embodiment is to severely restrict radial movement of the floating bearing relative to the stator unit (i.e. the bearing seat) by exerting a radial force on the floating bearing.

In the first variant of the third embodiment shown in FIG. 6, the same or analogous elements to those of FIG. 1 are generally designated with the same reference signs. In contrast to FIG. 1, FIG. 6 also shows a rotating mirror 1000 attached to the rotor 110, which can deflect a laser beam in a laser processing device, for example. However, this rotating mirror 1000 is not a necessary component of the third embodiment.

One can see in FIG. 6 a radial spring 600 designed as a helical spring, which is in contact with both the stator unit 130 and the outer ring 150a of the floating bearing 150 and can thus exert a force in the radial direction on the outer ring 150a of the floating bearing 150 from the outside. In this case, the inner ring 150b of the floating bearing 150 is rigidly connected to the rotor 110 as in the embodiment of FIG. 1, while the outer ring 150a has axial mobility relative to the stator unit 130. As a result of the spring force acting in the radial direction, the radial mobility of the outer ring 150a relative to the stator unit is restricted. The extent to which axial play is also restricted depends on the spring force. The radial spring 600 generally does not make a significant contribution to the axial stiffness of the arrangement (this is done by the wave spring), but the low radial mobility is ensured with high radial stiffness. In this regard, an adjustment screw 610 can be used to adjust the extension of the radial spring 600 in the radial direction, thereby adjusting a desired radial stiffness. In particular, the radial spring does not necessarily have to press the floating bearing 150 inward in the radial direction. Rather, it is also possible for the helical spring to be mounted in a condition in which it has an increased length compared to the relaxed (forceless) condition. In the latter case, a force acts on the floating bearing outwardly in a radial direction. In particular, it is possible to mount the spring in the relaxed state and to adjust it to the desired length by means of the adjusting screw 610.

FIG. 7 shows a second variant of the third embodiment, in which a force is exerted in the radial direction not by means of a radial spring, but by means of a magnet. In the example of FIG. 7, a magnet 700 is attached to the deflection mirror 1000. Only by way of example, an attachment to the rear side of the deflection mirror is shown. The magnet 700 can, of course, also be attached at other locations of a part rigidly connected to the rotor. By means of a bracket 750, a force is exerted across a gap 710 on the deflection mirror 1000 and thus also on the rotor 110, which is fixedly connected to the deflection mirror, whereby a radial movement is significantly made more difficult. For this purpose, the bracket comprises a magnet or magnetic material at the gap 710 at least at the end opposite the magnet 700. In particular, the entire bracket 750 can also consist of a magnet or of a material that has been magnetized.

In the example shown in FIG. 7, the bracket 750 is fixedly (rigidly) connected to the stator unit 130. In this example, the angular movement of the rotor 110 (and of the deflection mirror 1000) is limited to a range of ±20°, which is acceptable in many applications. Preferably, the angular movement of the rotor 110 (and of the deflection mirror 1000) is restricted to a range of ±10°. The force in the radial direction should be as high as possible while still not overly restricting axial mobility as well as rotational movement. The inventors assume that for usual vibrations with accelerations in the range of 5 to 50 g (g: gravitational acceleration), the radial force should be greater than five to 50 times the weight force of the system consisting of rotor and mirror.

Of course, instead of the magnet 700, the rear side of the deflection mirror 1000 can be covered with a magnetic layer. Furthermore, the bracket 750 can be brought into a magnetized state at least partially, preferably as a whole, by means of an electromagnet.

FIG. 8 shows a third variant of the third embodiment, in particular a section in the radial direction through the rotor 110 and the stator unit 130 with the coil 125.

In the variant of the third embodiment shown in FIG. 8, a radially asymmetric magnetic flux is provided, which results in a radial magnetic force on the rotor, which greatly limits its radial mobility relative to the stator unit. One can see in FIG. 8 a magnetic rotor 110 (for example, a permanent magnet), the coil 125, and a stator unit 130 that is asymmetrically formed insofar that a cavity filled with air is formed on one side. As can be seen in FIG. 8, the cavity 800 deflects the magnetic field lines such that a radial asymmetry of magnetic flux is created. Again, the radially exerted force should not exceed approximately five to 50 times the weight force of the system of rotor 110 and rotating mirror 1000.

It is immediately apparent that, in the third variant of the third embodiment, the rotor can alternatively or additionally have an asymmetrical shape to thereby cause or enhance asymmetry of the magnetic flux.

Furthermore, it can be seen that combinations of the different embodiments are also possible. Merely by way of example, a combination of the first and second embodiments, the first and third embodiments, or specifically a combination of the first embodiment with the third variant of the third embodiment may be mentioned here.

Finally, it should be emphasized that the present invention in all its embodiments and variants is not limited to the described axial preloading of the floating bearing by means of a spring. It is also conceivable that axial preloading of the floating bearing is provided by means of a suitable adhesive. This is done, for example, by preloading the floating bearing in the axial direction by means of a spring during assembly and introducing the adhesive into an existing gap between the floating bearing outer ring and the stator unit in the preloaded state. After the adhesive has cured, the spring used for axial preloading is then removed so that the adhesive now applies the preloading force. The adhesive can be any material that still has sufficient elasticity in the cured state to absorb the axial movement of the outer ring. In particular, the adhesive should show no or only very low plastic deformation under the influence of the preloading force in the cured state.

The invention claimed is:

1. A galvanometer drive comprising:
   a rotor which is rotatable about an axis of rotation and which comprises a magnet, and
   a stator unit which surrounds the rotor and which comprises a coil,
   the rotor being supported by two bearings, at least one of which is a floating bearing, in such a way that it can perform a rotational movement about the axis of rotation relative to the stator unit,
   characterized by a radial movement limiting device, which is adapted to limit the radial movement of the floating bearing with respect to the stator unit, wherein a ratio of radial stiffness to axial stiffness at the floating bearing is greater than 10.

2. The galvanometer drive according to claim 1, wherein the floating bearing comprises an outer ring, an inner ring and a plurality of rolling elements between the inner ring and the outer ring and
   the inner ring is rigidly attached to the rotor and the outer ring is displaceable in the direction of the axis of rotation,
   wherein the radial movement limiting device limits the radial movement of the outer ring with respect to the stator unit.

3. The galvanometer drive according to claim 1, wherein the radial movement limiting device is a spring element attached to the floating bearing by which the floating bearing is axially subjected to pressure, wherein the spring element has a portion rigidly attached to the floating bearing and another portion rigidly attached to the stator unit.

4. The galvanometer drive according to claim 3, wherein the spring element comprises a rotationally symmetrical, star-shaped arrangement of n leaf spring elements, n being a natural number greater than or equal to 3.

5. The galvanometer drive according to claim 4, wherein the number n of leaf spring elements is less than or equal to 100.

6. The galvanometer drive according to claim 3, wherein the spring element is designed as a disc spring or diaphragm spring.

7. The galvanometer drive according to claim 3, wherein the spring element has a displacement stiffness in the radial direction which is greater than the spring stiffness in the axial direction by at least a factor of 50.

8. The galvanometer drive according to claim 3, wherein the displacement stiffness in the radial direction has a value above 4 kN/mm, and below 1000 kN/mm.

9. The galvanometer drive according to claim 1, wherein the radial movement limiting device is a rolling guide mounted between the floating bearing and the stator unit and rigidly attached both to the floating bearing and to the stator unit.

10. The galvanometer drive according to claim 9, wherein the rolling guide consists of a guide inner element, a guide outer element and a plurality of rolling elements arranged therebetween.

11. The galvanometer drive according to claim 10, wherein the guide inner element is formed in one piece with the floating bearing and/or the guide outer element is formed in one piece with the stator unit.

12. The galvanometer drive according to claim 9, wherein the rolling guide is preloaded.

13. The galvanometer drive according to claim 1, wherein the radial movement limiting device applies a force to the floating bearing in the radial direction.

14. The galvanometer drive according to claim 13, wherein the radial movement limiting device comprises a spring element which is mounted between the stator unit and the rotor in such a way that the spring element exerts a force on the rotor in the radial direction.

15. The galvanometer drive according to claim 13, wherein the radial movement limiting device has a weight which generates the force on the floating bearing in the radial direction as a result of the action of gravity.

16. The galvanometer drive according to claim 13, wherein the radial movement limiting device applies a force to the floating bearing in the radial direction via electromagnetic interaction.

17. The galvanometer drive according to claim 13, wherein a force on the rotor in the radial direction is generated by generating a radially asymmetric magnetic field between the rotor and the stator unit.

18. The galvanometer drive according to claim 17, wherein a radially asymmetric magnetic field is generated by the presence of at least one region in the rotor or in the stator unit, which region has a different magnetic susceptibility than the rest of the rotor or the stator unit, respectively.

* * * * *